United States Patent

[11] 3,608,808

[72] Inventors Edgar Wolf
New Hyde Park;
Francis C. Marino, Huntington; Edward Henry Lau, Old Westbury; Marvin Laut, Huntington Station, all of N.Y.
[21] Appl. No. 804,907
[22] Filed Mar. 6, 1969
[45] Patented Sept. 28, 1971
[73] Assignee Digitronics Corporation
Albertson, N.Y.

[54] TAPE TRANSPORT TENSIONING MECHANISM

8 Claims, 2 Drawing Figs.

[52] U.S. Cl. .......... 226/195, 242/75.3
[51] Int. Cl. .......... B65h 23/10
[50] Field of Search .......... 226/195, 44, 113, 114, 189; 242/75.3

[56] References Cited

UNITED STATES PATENTS

| | | | |
|---|---|---|---|
| 3,384,281 | 5/1968 | Mason | 226/44 X |
| 2,091,692 | 8/1937 | Scott | 226/195 X |
| 1,411,789 | 4/1922 | Kellogg | 226/114 |

*Primary Examiner*—Richard A. Schacher
*Assistant Examiner*—Gene A. Church
*Attorney*—Yuter & Fields

ABSTRACT: A tensioning mechanism for use in a tape transport mechanism of the type which is operable to transport a tape medium between feed and takeup reels mounted on a tape deck. The mechanism includes a stationary roller means for guiding the medium in a preselected path, first movable tensioning means for biasing the medium in a first direction and second movable tensioning means having a smaller inertia than the first tensioning means and being pivotable about said stationary roller means for biasing said medium in a direction opposite to the first direction to continuously maintain the tape medium under tension and to prevent breakage of the medium during stepping of the medium.

PATENTED SEP 28 1971 3,608,808

Figure 1:
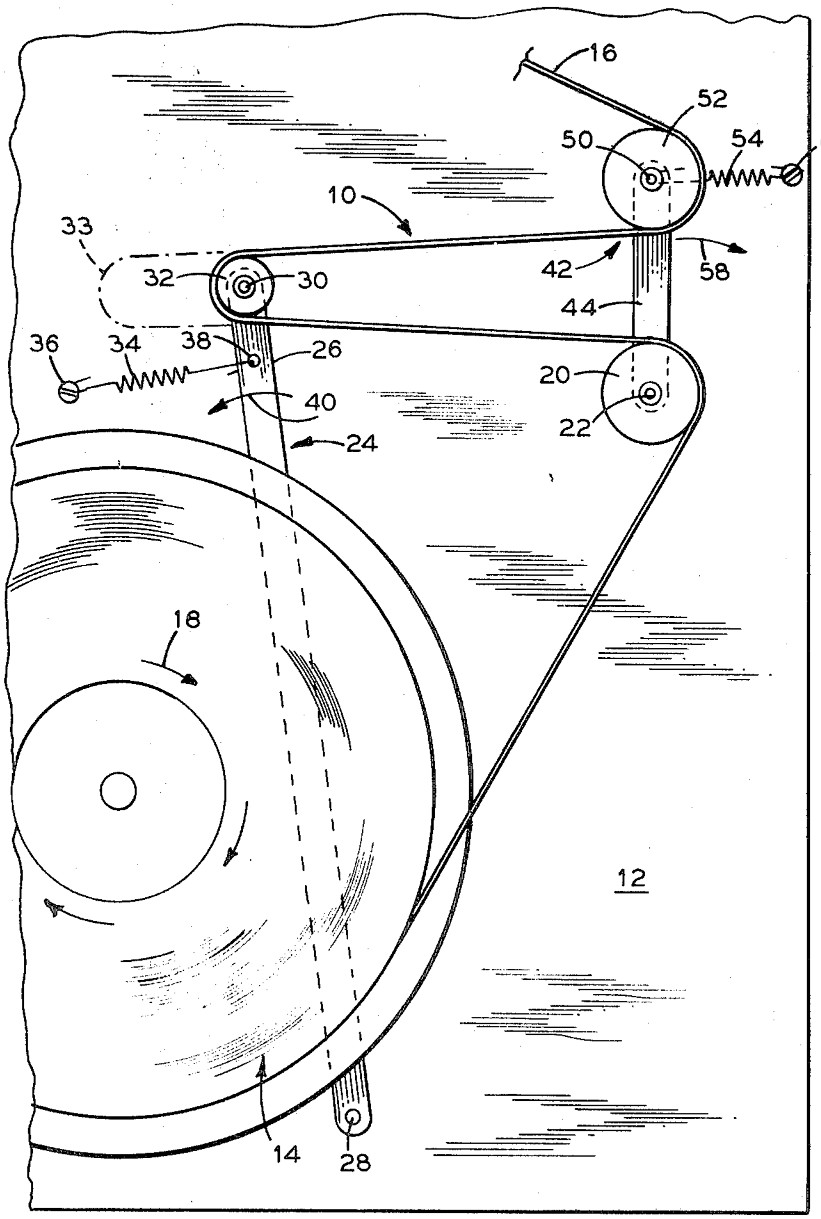

*INVENTORS*
EDGAR WOLF
FRANCIS C. MARINO
EDWARD HENRY LAU
MARVIN LAUT
BY Yuter & Spiecens
ATTORNEYS

TAPE TRANSPORT TENSIONING MECHANISM

This invention relates generally to a tensioning mechanism for a tape transport and, more particularly, relates to a tensioning mechanism which substantially eliminates the possibility of tape breakage or tearing during movement of the tape medium.

Movement of a tape medium in a data communications system presents many problems which are not readily encountered in a conventional tape transport mechanism of the type utilized in, for example, audio or high-fidelity equipment. Thus, in an audio system magnetic tape is continuously moved past a read head and is rewound in the opposite direction. On the other hand, in a data communications system, the tape medium is usually intermittently stepped in either the forward or reverse directions with respect to a read head and at either fast or slow rates.

Hence, the tape medium in the latter type of system is continuously subjected to stress and strain each time the transport apparatus is actuated.

To be more specific, to maintain the tape medium taut, transport mechanisms used in data communication systems include a spring-loaded tension arm which is biased into engagement with the tape medium to maintain the medium under tension. While this construction operates well at relatively low stepping speeds, it fails at rapid or high tape stepping rates and, in most cases, causes damage to the tape medium. More particularly, so-called standing waves are set up in the tape medium at high stepping rates.

The relatively large inertia of the tension arm prevents it from following tape activity when the medium is moved at such rapid stepping rates and, as a result, a slack develops and the tape medium moves away from the arm. The biasing spring causes the arm to move toward the tape to again maintain the tape medium under tension.

In practice, the tension arm gains sufficient momentum during this movement so that the arm strikes the tape medium with an impact which is sufficient to break the medium. Alternatively, the tension arm may become misaligned with the tape medium after the medium has left contact with the arm so that the sharp edge of the tension arm hits the medium during movement of the arm thereby causing the medium to tear. Consequently, the system must be halted and the damaged medium either spliced or replaced.

Accordingly, an object of the present invention is to provide an improved tape transport tensioning mechanism.

A more specific object of the invention is to provide a transport mechanism for a tape medium which is specifically adapted for use in the data communications field which substantially eliminates the possibility of tape breakage due to the action of the tensioning arm during rapid stepping of the tape medium.

Another object of the invention resides in the novel details of construction which provide a tape transport tensioning mechanism of the type described wherein the tensioning arms are maintained in contact with the tape medium at all times.

Accordingly, a tape transport tensioning mechanism constructed in accordance with the present invention is adapted to place a tape medium extending between a feed reel and a takeup reel on a tape deck under tension. A first stationary guide roller means is provided on the deck for guiding the medium in a preselected path, first movable tensioning means is positioned to engage the medium and to bias the medium in a first direction, and second movable tensioning means, pivotable about said stationary guide means, is provided to engage the medium and to bias the medium in a direction opposite to said first direction whereby said first and second movable tensioning means are always maintained in contact with the tape medium to maintain the tape medium under continuous tension.

Figure 2:
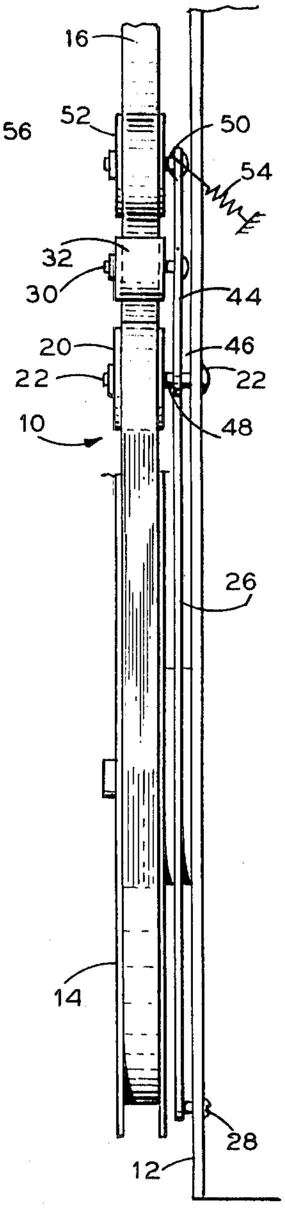

Other features and advantages of the present invention will become more apparent from a consideration of the following detailed description when taken in conjunction with the accompanying drawing, in which:

FIG. 1 is a top plan view of a tape transport tensioning mechanism constructed according to the present invention, illustrating a portion of a tape deck necessary for an understanding of the invention; and FIG. 2 is a side elevational view thereof.

The tape transport tensioning mechanism is designated generally by the reference numeral 10 in the figures and is adapted to be used with a tape deck 12 of the type having a feed reel (not shown) and a takeup reel 14. Additionally, the tape deck 12 includes a selectively operable driving apparatus (not shown) which may include a pinch roller movable to pinch a tape medium 16 between the pinch roller and a rotating capstan to effect movement of the tape medium past the appropriate heads. Since these portions of the tape deck are conventional and well known in construction, they are not shown in detail herein. Only those portions of the tape deck necessary for an understanding of the invention are disclosed in detail.

Accordingly, the takeup reel 14 is removably mounted on the tape deck 12 and is rotatable in the direction designated by arrowhead 18 to wind the tape medium 16 thereon. The mechanism 10 includes a first stationary guide roller means including a roller 20 which is rotatably mounted on the tape deck 12 by an upstanding shaft 22 to align the tape medium in the desired path. A first movable tensioning means, designated generally by the reference numeral 24, is provided for biasing the tape medium in a first direction.

More specifically, the first tensioning means 24 includes an elongated arm 26 which is pivotally mounted on the tape deck 12 by a shaft 28. As shown in FIG. 1, the arm 26 extends from a point adjacent the lower right-hand edge of the reel 14 and terminates substantially above the top edge of the reel. Upstanding from the arm 26 adjacent the upper edge thereof is a shaft 30 which rotatably mounts a roller 32. One end of biasing spring 34 is connected to a post 36 upstanding from the tape deck 12. The other end of the spring 34 is received through an aperture 38 in the arm 26. The spring 34 biases the arm 26 in the direction indicated by the arrowhead 40.

The first tensioning means has a relatively high inertia so that the arm 26 follows the movement of the tape medium 16 at low stepping rates but operates to slowly follow such movement at high stepping rates. That is, during the startup cycle the tape medium is fed to the takeup reel at a faster rate than the takeup reel 14 can accommodate it. As a result, with conventional constructions, the tape medium would leave roller 32 as indicated by the dashed lines 33. The spring 34 would then snap the arm 26 counterclockwise thereby causing the roller 32 to hit the medium with sufficient force to damage the same.

However, in accordance with the present invention, there is provided a second tensioning means, designated generally by the reference numeral 42 which is operable to bias the tape medium 16 in a direction opposite to the direction indicated by the arrowhead 40. To be specific, the tensioning means 42 includes a relatively small arm 44 which is pivotable about the stationary guide roller means. That is, the lower end of the arm 44 is rotatably received on the shaft 22 between bushings 46 and 48. Upstanding from the arm 44 adjacent the upper end thereof is a shaft 50 which rotatably mounts a roller 52. One end of a spring 54 is connected to a post 56 upstanding from the tape deck 12. The other end of the spring 54 is connected to the shaft 50. Thus, the spring 54 functions to bias the arm 44 in the direction indicated by arrowhead 58 or, in the other words, in a direction opposite to the direction indicated by the arrowhead 40.

Because of the relatively small arm 44 of the tensioning means 42, the tensioning means has a small radius of movement and has a relatively small inertia as compared to the tensioning means 24. As a result, the tensioning means 42 can move quickly and can follow the tape movement at both high and low stepping speeds. However, in order to prevent natural oscillations of the arm 44 during rapid stepping of the tape medium 16, the bushings 46 and 48 exert a slight frictional force on the arm 44 to overdamp the movement of the arm.

It is to be understood that the rollers 20, 32 and 52 are provided with peripheral grooves of sufficient height and depth to accommodate the particular type of tape medium used. Moreover, the rollers may be fabricated from stainless steel or the like.

In practice, the tape medium 16 is wound about the roller 52, the roller 32 and the roller 20 and is connected to the takeup reel 14 in he conventional manner. The takeup reel 14 is initially rotated thereby tightening the tape medium 16 thereabout until an equilibrium state is reached whereby the arm 44 is moved slightly counterclockwise about the shaft 22 and the arm 26 is moved clockwise about the pivot or shaft 28 against the force of the respective biasing springs 54 and 34. These biasing springs 54 and 34 set up reaction forces which bias the arm 44 and 26 in the directions indicated by the respective arrowheads 58 and 40. Accordingly, the rollers 52 and 32 engage the tape medium 16 and, since the rollers are urged in opposite direction, maintain the required tension on the tape medium.

When the drive mechanism (not shown) is actuated, the tape medium 16 is initially fed to the reel 14 at a faster having than the takeup reel can accommodate the tape, as is conventional in this type of apparatus. However, as a slack begins to develop in the tape medium 16, the spring 54 urges the roller 52 in the clockwise direction into engagement with the tape medium and the spring 34 urges the roller 32 in the opposite or counterclockwise direction into engagement with the tape medium 16. At high or rapid stepping rates, the tape medium 16 again is fed to takeup reel 14 at faster rate than takeup reel 14 can wind the medium thereon. However, as slack again begins to develop in the medium, the arm 44, having a relatively small moment of inertia, quickly moves clockwise to maintain the roller 52 in engagement with the tape. Thus, the tensioning means 42, in effect, supplements the action of tensioning means 24 and prevents the tape medium from leaving contact with the rollers 52 and 32. In other words, the movable tensioning means 42 and 24 follow the movement of the tape medium 16 throughout the cycle of operation and the rollers 52 and 32 are always maintained in engagement with the tape medium so that breakage of the tape medium by the intermittent contact of a movable tensioning arm therewith is eliminated.

Accordingly, an improved tape transport tensioning mechanism has been disclosed which is operable to maintain a tape medium under tension and to substantially eliminate the possibility of tape breakage due to intermittent or delayed contact of a tensioning arm with the tape medium.

While a preferred embodiment of the invention has been shown and described herein it will be obvious that numerous omissions, changes and additions may be made in such embodiment without departing from the spirit and scope of the present invention.

What is claimed is:

1. A tape transport tensioning mechanism for use with a tape deck of the type having drive means for transporting a tape medium between a feed reel and a takeup reel, said mechanism including a stationary guide roller means on said tape deck for guiding said medium in a preselected path, first movable tensioning means positioned to engage said medium for biasing said medium in a first direction, and second movable tensioning means pivotable about said stationary guide means and positioned to engage said medium for biasing said medium in a direction opposite to said first direction, said stationary guide roller means including a shaft, a first roller rotatably mounted on said shaft, and said second tensioning means including an arm having one end rotatably received on said shaft, and a second roller rotatably mounted on the other end of said arm.

2. A tape transport tensioning mechanism as in claim 1, in which said second tensioning means further includes a spring connected between said arm and the tape deck for biasing said arm in said opposite direction.

3. A tape transport mechanism as in claim 2, in which said first tensioning means includes an elongated arm having one end pivotally mounted on the tape deck, a rotatable roller mounted on said elongated arm adjacent the other end thereof and positioned to engage said tape medium, and a spring connected between said elongated arm and the tape deck for biasing said elongated arm in said first direction.

4. A tape transport mechanism as in claim 3, in which said second tensioning means arm is smaller than said first tensioning means arm.

5. A tape transport tensioning mechanism for use with a tape deck of the type having drive means for transporting a tape medium between a feed reel and a takeup reel said mechanism including a stationary guide roller means on said tape deck for guiding said medium in a preselected path, first movable tensioning means positioned to engage said medium for continuously biasing said medium in a first direction, and a second movable tensioning means having a relatively small moment of inertia to follow the tape medium movement at relatively high rates of movement for continuously biasing said medium in a direction opposite to said first direction, whereby said second tape tensioning means maintains contact with said tape medium at said high rates of movement.

6. A tape transport tensioning mechanism as in claim 5 in which said first movable tensioning means has a relatively large moment of inertia.

7. A tape transport tensioning mechanism as in claim 5, in which said first movable tensioning means includes a relatively long arm pivoted on said tape deck adjacent one end and carrying a medium-engaging roller adjacent the other end, and said second tensioning means includes a relatively short arm pivotable about said guide roller means adjacent one end and carrying a medium-engaging roller adjacent the other end.

8. A tape transport tensioning mechanism as in claim 7, and means frictionally engaging said short arm for dampening movement of said short arm.